US 6,658,318 B1

(12) United States Patent
Kimura

(10) Patent No.: US 6,658,318 B1
(45) Date of Patent: Dec. 2, 2003

(54) METHOD AND APPARATUS FOR SYNCHRONOUS OPERATION OF A PLURALITY OF INJECTION MOLDING DEVICES

(75) Inventor: Takashi Kimura, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 490 days.

(21) Appl. No.: 09/689,855

(22) Filed: Oct. 13, 2000

(30) Foreign Application Priority Data

Oct. 15, 1999 (JP) .......................................... 11-293097

(51) Int. Cl.$^7$ .............................................. B29C 45/00
(52) U.S. Cl. ......................... 700/200; 700/92; 264/401
(58) Field of Search .............................. 700/200, 102, 700/205; 264/40.1

(56) References Cited

U.S. PATENT DOCUMENTS 5,536,159 A * 7/1996 Yamamura et al. ......... 425/149
5,580,584 A * 12/1996 Mussler et al. ............ 425/143
6,258,303 B1 * 7/2001 Hibi et al. ................. 264/40.5
6,275,741 B1 * 8/2001 Choi .......................... 700/200

* cited by examiner

Primary Examiner—Leo Picard
Assistant Examiner—Kidest Bahta
(74) Attorney, Agent, or Firm—Browdy and Neimark

(57) ABSTRACT

A method of synchronously operating a plurality of injection molding devices which associate in producing a composite molding product, comprising the step of: simultaneously initiating a predetermined action in the plurality of injection molding devices, on the basis of an initiation timing of the predetermined action in one of the plurality of injection molding devices whose initiation timing of the predetermined action is latest in the plurality of injection molding devices. An apparatus for suitably executing the present method is also disclosed wherein each injection molding device includes: a control device having a signal output port for transmitting an initiation standby signal of a predetermined action thereof and an signal input port for receiving the initiation standby signal of the predetermined action of the other injection molding devices, and actuators for driving an injection device and/or a mold clamping device thereof so as to execute the predetermined action. The actuators are executed when the control device transmits an initiation signal to the actuator by ANDing all of the received and generated initiation standby signals.

7 Claims, 2 Drawing Sheets

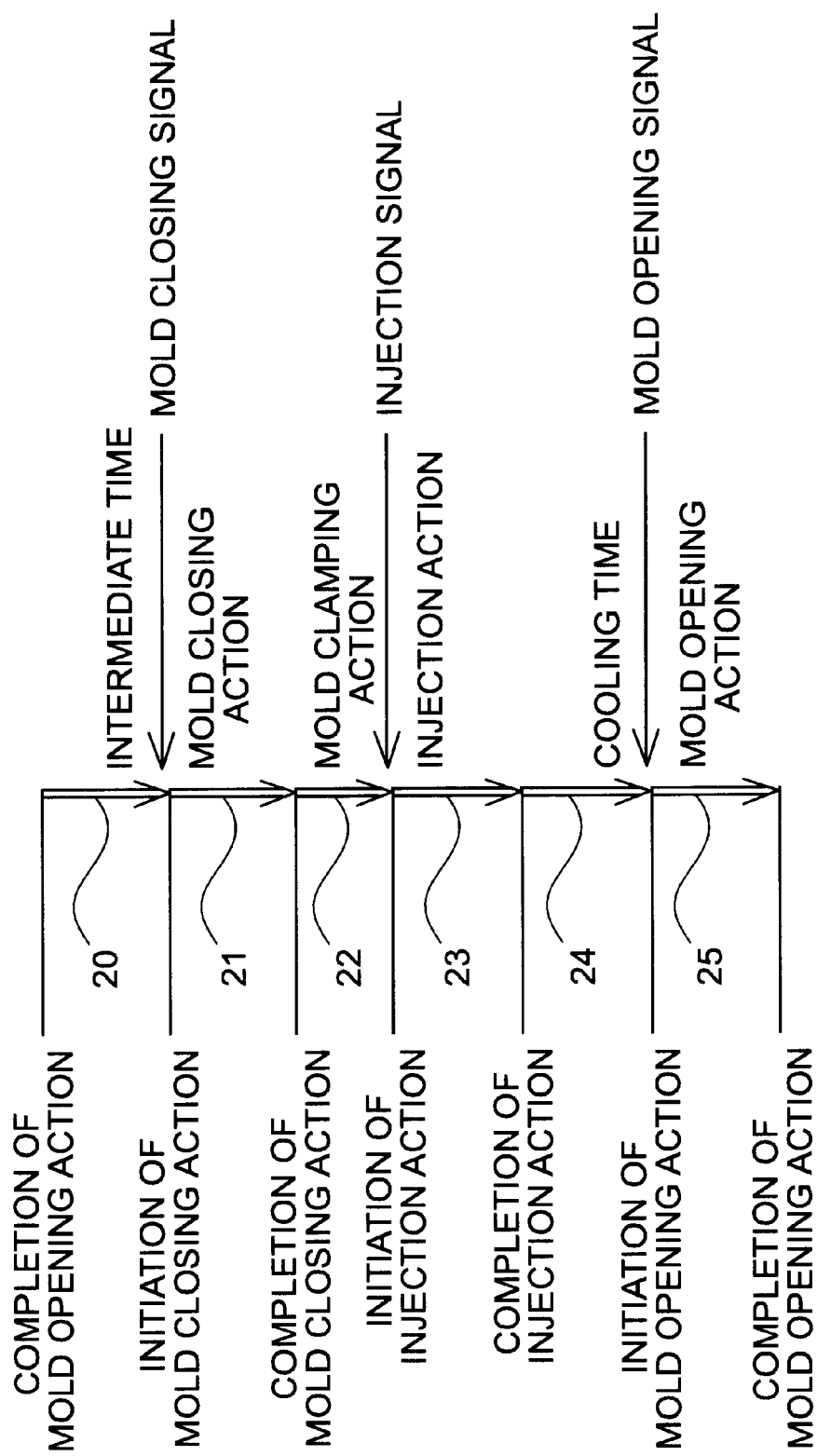

METHOD AND APPARATUS FOR SYNCHRONOUS OPERATION OF A PLURALITY OF INJECTION MOLDING DEVICES

BACKGROUND OF THE INVENTION

1. Field of the Invention

The present invention relates to a method and apparatus for synchronous operation of a plurality of injection molding devices which associate in producing a composite molding product, wherein the plurality of injection molding devices are synchronously operated by exchanging signals therebetween.

2. Description of the Related Art

There is known a composite molding product which is formed by assembling a plurality of components molded by using a plurality of injection molding devices, respectively. In a formation of such a composite molding product, it is significantly difficult to operate the plurality of injection molding devices at the same cycle time, for the following reasons: Namely, even where the plurality of injection molding devices are arranged for molding the components whose configurations are substantially similar to each other, masses of molten resin stored in injection devices of the injection molding devices have respective temperatures which are slightly different from each other, leading to difficulty in informing molding conditions such as an injection time and a cooling time of the injection molding devices. Moreover, the plurality of injection molding devices require respective period of times for executing a mold opening and closing actions, which period of times vary depending on structures and characteristics of the injection molding devices. Therefore, the cycle times of the plurality of injection molding devices inevitably deviate from the nominal value by a several percent.

In the presence of the deviation of the cycle times, one injection molding device whose cycle time is relatively shorter than that of the other injection molding device(s) is likely to produce more components than the other injection molding device(s) do. Since the components molded by the respective injection molding devices are assembled together to provide the composite molding product, it becomes a problem how to deal with surplus components molded by the injection molding device of shorter cycle time. In particular, for producing a digital video disk (DVD), for example, two injection molding devices produce respective component disks, and these two component disks are integrally bonded to each other at respective bonding surfaces to provide a bonded composite disk used as the DVD. In this case, the two injection molding devices are required to substantially simultaneously produce the component disks to be integrally bonded together to form the DVD. If this requirement is not satisfied, the resultant DVD may suffer from defects such as bending or buckling thereon. Therefore, the surplus components have to be disposed, undesirably. To solve this drawback, it can be envisioned to compensate a molding condition of the injection molding device of shorter cycle time so as to fit to that of the injection molding devices of longer cycle time, at appropriate opportunities during injection molding operations. However, such a compensation of the molding condition is not practical in view of significant difficulty in keeping a desired molding condition for a long period of time as described above. Besides, it can also be envisioned to once suspend operation of the injection molding machine, if an integrated value of deviation of the cycle times of the injection molding devices exceeds a value of one cycle time of the injection molding device of shorter cycle time. However, long-term suspension of the operation of the injection molding device causes undesirable change of temperature of a mass of molten or plasticized resin material stored in the injection apparatus of the injection molding device. Thus, the injection molding device is incapable of forming desired components for a while, after the operation of the injection molding device is resumed. This drawback may similarly occur, when any of the injection molding device comes to a standstill for some reasons.

SUMMARY OF THE INVENTION

The present invention has been developed in view of the circumstances described above. It is therefore a first object of the present invention to provide a method of synchronously operating a plurality of injection molding devices which associate in producing a composite molding product, by exchanging signals therebetween.

It is a second object of the invention to provide an injection molding system suitable for practicing the method indicated above.

The first object may be achieved according to one aspect of this invention, which provides a method of synchronously operating a plurality of injection molding devices which associate in producing a composite molding product, comprising the step of: simultaneously initiating a predetermined action in the plurality of injection molding devices, on the basis of an initiation timing of the predetermined action in one of the plurality of injection molding devices whose initiation timing of the predetermined action is latest in the plurality of injection molding devices.

The first object may also be achieved according to another aspect of this invention, which provides a method of synchronously operating a plurality of injection molding devices which associate in producing a composite molding product, wherein each of the plurality of injection molding devices includes: a control device having a signal output port for transmitting an initiation standby signal of a predetermined action thereof and an signal input port for receiving the initiation standby signal of the predetermined action of the other injection molding devices, and actuators for driving an injection device and/or a mold clamping device thereof so as to execute the predetermined action of the corresponding injection molding device, the method comprising the steps of: operating the control device to transmit the initiation standby signal of the corresponding injection molding device through the signal output port; operating the control device to generate an initiation signal of the corresponding injection molding device, when the control device receives the initiation standby signals of the all other injection molding devices and generates the initiation standby signal of the corresponding injection molding device, so as to actuate the actuator, whereby the corresponding injection molding device execute the predetermined action.

The second object indicated above may be achieved according to a yet another aspect of the present invention, which provides an apparatus for synchronous operation of a plurality of injection molding devices, comprising: a plurality of injection molding devices each including a control device having a signal output port for transmitting an initiation standby signal of a predetermined action thereof and an signal input port for receiving the initiation standby signal of the predetermined action of the other injection molding devices, and actuators for driving an injection device and/or a mold clamping device thereof so as to execute the predetermined action of the corresponding injection molding device, the control device being operable for transmitting the initiation standby signal of the corresponding injection molding device to the other injection molding devices through the signal output port, and being operable for receiving the initiation standby signals of the all other injection molding devices, while being operable for ANDing all of the initiation standby signals received by and generated in the control device, so as to transmit an initiation signal to the actuator, thereby actuating the actuator to execute the predetermined action of the corresponding injection molding device.

BRIEF DESCRIPTION OF THE DRAWINGS

The above and other objects, features, advantages and technical and industrial significance of the present invention will be better understood by reading the following detailed description of the presently preferred embodiment of the invention, when considered in connection with the accompanying drawings, in which:

FIG. 2 is a view schematically illustrating sequence of actions of an injection molding operation performed by each of the two injection molding apparatuses, together with signals utilized therein.

DETAILED DESCRIPTION OF THE PREFERRED EMBODIMENT

Figure 1:
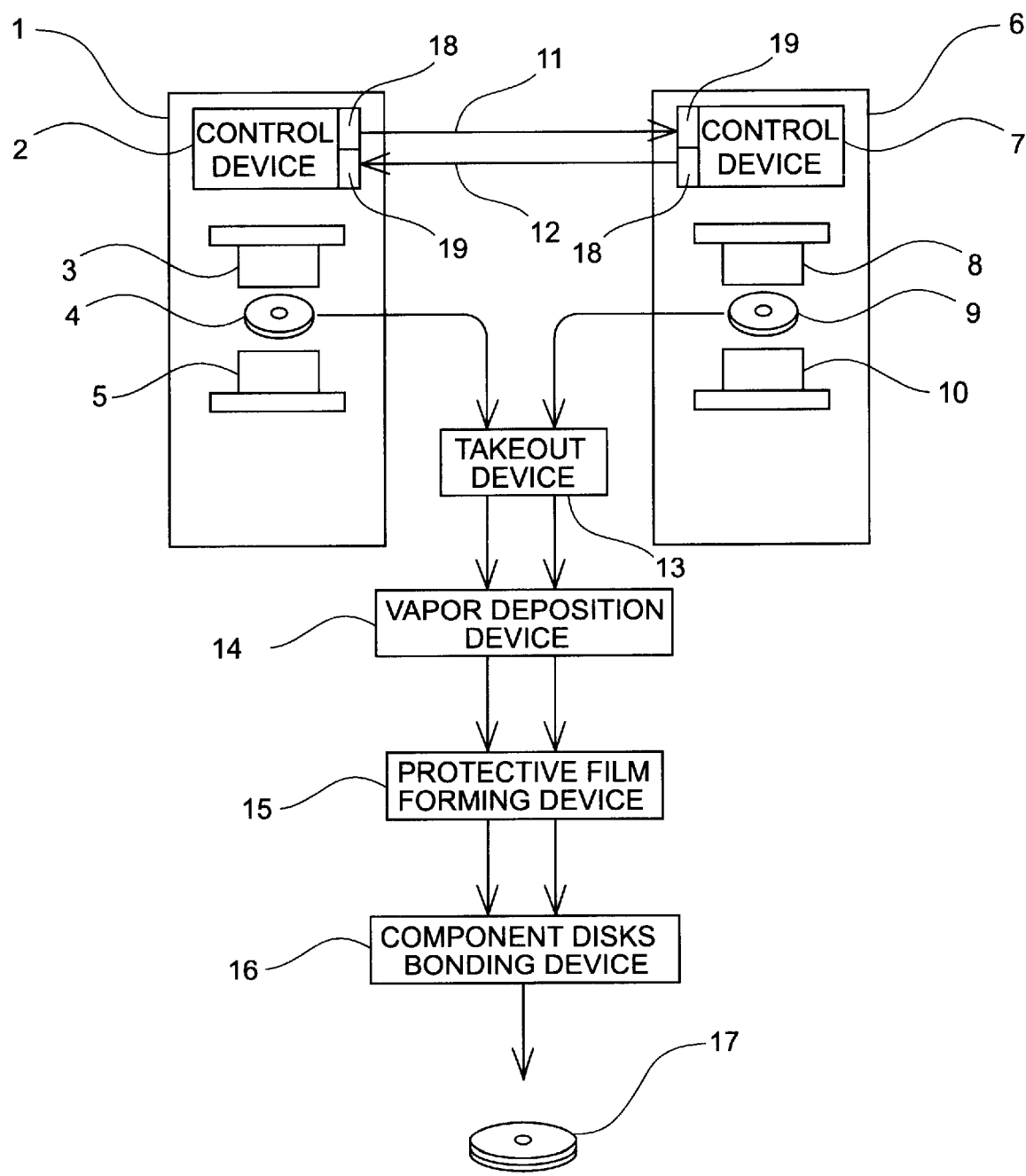
FIG. 1 is a block diagram schematically illustrating a method of producing a digital video disk by using two injection molding devices which are synchronously operated according to one embodiment of this invention.

Referring first to FIG. 1, there is schematically illustrated a method of producing a digital video disk (DVD) by using two injection molding devices 1, 6 each of which includes a mold clamping device and an injection device (not shown). The injection molding devices 1, 6 further include respective control devices 2, 7 in the form of programmable logic controllers (PLC) or the like. Each of the control devices 2, 7 is adapted to control operation of the corresponding mold clamping and injection devices, according to a predetermined sequence control program. As for the mold clamping and injection devices, various kinds of known devices arranged for producing a disk substrate may be employable. The mold clamping devices of the respective injection molding devices 1, 6 are adapted to open, close and clamp pairs of metallic mold halves 3, 5, and 8, 10, respectively. With each pair of mold halves 3, 5 or 8, 10 held in abutting contact with each other to define therebetween a mold cavity, the corresponding mold clamping device is operated to clamp the pair of mold halves 3, 5 or 8, 10. In this condition, the corresponding injection device is operated to inject a suitable molten resin material into a mold cavity between the pair of mold halves 3, 5 or 8, 10. The masses of the molten resin material filling the mold cavities are cooled to be solidified, and then ejected from the mold cavities, thereby obtaining molded component disks 4, 9.

Referring next to FIG. 2, there is shown sequence of actions of the injection molding operation executed by the two injection molding apparatus 1, 6. The sequence includes an intermediate time 20, a mold closing action 21, a mold clamping action 22, an injection action 23, a cooling time 24 and a mold opening action 25. The component disks 4, 9 molded in the mold cavities defined by the pairs of mold halves 3, 5 and 8, 10, respectively, are taken out from the respective mold cavities by means of the takeout device 13, during the intermediate time 20. Each of the component disks 4, 9 is further processed in a vapor deposition device 14 so that a reflector film is formed on one of major surfaces of the component disk on which information in the form of pits are reproduced, and then is processed in the protective film forming device 15 so that a protective film is formed on the formed reflector layer of the component disk. Subsequently, the component disks 4, 9 are further processed in the component disks bonding device 16 such that the component disks 4, 9 are bonded to each other at respective surfaces on which the protective films are formed, thereby providing a bonded composite disk as a DVD 17. It is noted that the takeout device 13, the vapor deposition device 14 for forming a reflector film, the protective film forming device 15, and the component disks bonding device 16 may be formed by utilizing various kinds of known devices used for producing a disk product.

It is noted that the intermediate time 20 should be interpreted as a predetermined period of time after the completion of the mold opening action and before the initiation of the mold closing action. The intermediate time 20 is set in and controlled by timers or time counters formed in the respective control devices 2, 7. In general, an injection molding apparatus for producing a disk substrate requires having a sufficiently shortened cycle time. In this case, the injection molding device may be controlled such that the mold closing action is initiated immediately after detection of a signal from the takeout device 13 which indicates that the component disks 4, 9 are taken out from the corresponding mold by the takeout device 13, without waiting for the elapse of the intermediate time.

The control devices 2, 7 of the respective injection molding devices 1, 6 include respective sequencers each storing the same ladder diagram. The each of the control devices 2, 7 controls the mold clamping and injection devices of the corresponding injection molding device, according to the ladder diagram stored in its sequencer, based on positional signals applied from actuators of the mold clamping and injection devices and a timer of the control device, so that the mold clamping and injection devices successively execute the mold closing action 21, the mold clamping action 22, the injection action 23, the cooling time 24, the mold opening action 25. The ladder diagram stored in the sequencer is arranged such that the control devices 2, 7 generate control signals as initiation signals including a mold closing signal for initiating the mold closing action 21, an injection signal for initiating the injection action 23 and a mold opening signal for initiating the mold opening action 25. Upon generating the control signals, the actuators of the injection device and the mold clamping device of each of the injection molding devices 1, 6, are operated so that the injection molding devices 1, 6 can execute demanded actions.

As for the actuators used in the each injection device, an electric motor and a hydraulic cylinder device may be employed for driving an injection screw or plunger in its advancing or retracting directions, and an electric or hydraulic motor may be employed for rotating the injection screw. As for the actuator used in the each mold clamping device, an electric motor and hydraulic cylinder device may be employed for driving its movable platen toward and away from its stationary platen in order to ensure the mold opening and closing actions, and for forcing the movable platen against the stationary platen in order to ensure the mold clamping action. Further, the control signals transmitted from the control devices 2, 7 to the actuators so as to execute the specific operations of the injection and mold clamping devices, may be usable as the initiation signals.

The control device 2 is arranged to generate its initiation signal by logically ANDing its own initiation standby signal 11 and the initiation standby signal 12 received from the control device 7, while the control device 7 is arranged to generate its initiation signal by logically ANDing its own initiation-standby 12 and the initiation standby signal 11 received from the control device 2. In the ladder diagram, the initiation signal is excited when the initiation standby signals 11, 12 are electrically connected in series. For receiving the initiation standby signal from the other injection molding devices, the control devices 2, 7 of the injection molding devices 1, 6 should have the desired number of signal input port(s) 19, that desired number is obtained by subtracting 1 from the total numbers of injection molding devices in the injection molding system (e.g., one in the present embodiment). Further, each of the control devices 2, 7 has a signal output port 18 for transmitting its own initiation standby signal to the other injection molding device. In this respect, the number of the output port 18 formed in each injection molding device is not particularly limited, but may be equal to the number of the all other injection devices, or alternatively may be one. If the each control device have a single output port 18, the output port 18 is suitably arranged so that the output signal is branched off to be transmitted to the all other injection molding devices.

There will be described operation of the injection molding system according to the present embodiment. In both of the injection molding devices 1, 6, the respective control devices 2, 7 generate the initiation signals, upon detection of both of the initiation standby signals 11, 12 of the respective injection molding devices 1, 6. In this respect, the injection molding devices 1, 6 may otherwise be controlled by the respective control devices 2, 7 such that the injection molding devices 1, 6 generate their initiation signals based only on their own initiation standby signals, but not on the initiation standby signals generated by the other injection molding devices. If the mold closing signal is employed as the initiation signal, the injection molding devices 1, 6 are controlled so as to simultaneously start the mold closing action 21, when the intermediate time 20 has passed or the product takeout action has completed in both of the injection molding devices 1, 6. In this case, the control devices 2, 7 are arranged to generate an operation completion signal representing the completion of the intermediate time 20 or the product takeout action, for example, which signal is employed as the initiation standby signals 11, 12.

Described in detail, both of the injection molding devices 1, 6 simultaneously start their mold closing actions 21, i.e., their next injection molding cycles, based on the initiation timing of the mold closing action of one of the injection molding devices 1, 6 whose product takeout action is executed later. In this arrangement, a series of the subsequent steps executed after the completion of the product takeout action in each of the injection molding devices 1, 6, is simultaneously started with respect to the molded component disks 4, 9, every injection molding cycle. Thus, it is effectively avoided that one of the component disks 4, 9 is produced in surplus with respect to the other component disk in the product takeout action, causing undesirable disorder in the series of the subsequent steps after the product takeout actions. Moreover, both of the molded component disks 4, 9 can have the generally same elapsed time after being taken out from the corresponding mold cavities and before being bonded together in to the bonded composite disk in the form of the DVD 17 in every molding cycle, thereby avoiding the conventionally experienced defects such as bending on the DVD 17 due to the difference in a cooling history and shrinkage between the molded component disks 4 and 9. When the mold closing signal is employed as the initiation signal, the injection molding devices 1, 6 have to wait for the generation of the initiation signal (i.e., the mold closing signal) with their molds opened for different period of times. This may possibly leads to undesirable variation in cooling conditions or temperatures of the mold cavities of the injection molding devices 1, 6, possibly causing adverse effects on the successive injection molding operation of the injection molding devices 1, 6.

If the injection signal is employed as the initiation signal, the injection molding devices 1, 6 are controlled to simultaneously initiate their injection actions after their mold clamping actions are completed. In this case, the injection molding apparatus 1, 6 can wait for the initiation of their injection action with their molds closed, effectively avoiding adverse effects due to the aforementioned cooling of the mold cavities. The same effects can be enjoyed if the mold opening signal is employed as the initiation signal. The initiation signal may be suitably determined by an operator to at least one signal selected from the group consisting of the mold closing signal, the injection signal, and the mold opening signal, taken into account the configuration of the molded product, conditions of the subsequent steps, degree of difference in cycle times of the injection molding devices. The control devices 2, 7 of the injection molding devices 1, 6 facilitate operation for selecting and changing the desired initiation signal.

It is noted that the above-indicated synchronization of the predetermined actions of the all injection molding devices may be executed every molding cycle, or alternatively every given number of molding cycles.

As is apparent from the aforementioned description, the present invention permits a synchronized operation of a plurality of injection molding devices which associate in producing a composite molding product, by exchanging signals between the plurality of injection molding devices, by using a simply constructed apparatus, thereby effectively avoiding unnecessary production of the components of the composite molding products, and assuring a sufficient operation stability in the subsequent steps executed after the molded components take out from the respective mold cavities.

While the present invention has been described in detail in its presently preferred embodiment by reference to the accompanying drawings, for illustrative purpose only, it is to be understood that the invention is not limited to the details of the illustrated embodiment, but may be otherwise embodied with various other changes, modifications and improvements, which may occur to those skilled in the art, in the light of the foregoing teachings, without departing from the spirit and scope of the invention defined in the subsequent claims.

What is claimed is:

1. A method of synchronously operating at least two injection molding devices each of which can mold a component disk, comprising the step of:

simultaneously initiating a predetermined action in each of said two injection molding devices, on the basis of an initiation timing of said predetermined action in one of said two molding devices whose initiation timing of said predetermined action is latest in said two injection molding devices;

each of the two injection molding devices simultaneously molding a component disk; and integrally bonding said component disks to each other to produce a bonded composite disk used for a digital video disk.

2. A method according to claim 1, wherein said predetermined action comprises at least one action selected from a group consisting of a mold closing action, an injection action and a mold opening action.

3. A method according to claim 1, wherein said step of simultaneously initiating a predetermined action in said two injection molding devices is executed every injection molding cycle.

4. A method of synchronously operating at least first and second injection molding devices which associate to produce a composite molding product from component disks respectively and simultaneously molded by the first and second injection molding devices, wherein each of said first and second injection molding devices includes: a control device having a signal output port for transmitting an initiation standby signal of a predetermined action thereof and an signal input port for receiving the initiation standby signal of said predetermined action of the other injection molding device, and actuators for driving an injection device and/or a mold clamping device thereof so as to execute said predetermined action of the corresponding injection molding device, said method comprising the steps of:

operating said control device to transmit said initiation standby signal of the corresponding injection molding device through said signal output port; and operating said control device to generate an initiation signal of the corresponding injection molding device, when said control device receives said initiation standby signals of the other injection molding device and generates said initiation standby signal of said corresponding injection molding device, so as to actuate said actuator, whereby the corresponding injection molding device execute said predetermined action.

5. A method according to claim 4, wherein said initiation signal comprises at least one signal selected from a group consisting of a mold closing signal, an injection signal and a mold opening signal.

6. An apparatus for synchronous operation of at least first and second injection molding devices which associate to produce a composite molding product from component disks respectively molded by the first and second molding devices, wherein:

the first and second injection molding devices each include a control device having a signal output port for transmitting an initiation standby signal of a predetermined action thereof and an signal input port for receiving the initiation standby signal of said predetermined action of the other injection molding device, and actuators for driving an injection device and/or a mold clamping device thereof so as to execute said predetermined action of the corresponding injection molding device, said control device being operable for transmitting said initiation standby signal of the corresponding injection molding device to the other injection molding devices through said signal output port, and being operable for receiving said initiation standby signals of the other injection molding device, while being operable for ANDing all of said initiation standby signals received by and generated in said control device, so as to transmit an initiation signal to said actuator, thereby actuating said actuator to execute said predetermined action of the corresponding injection molding device.

7. An apparatus according to claim 6, wherein said initiation signal comprising at least one signal selected from the group consisting of a mold closing signal, an injection signal and a mold opening signal.

\* \* \* \* \*